US009516100B2

(12) United States Patent
Wilson

(10) Patent No.: US 9,516,100 B2
(45) Date of Patent: Dec. 6, 2016

(54) METHOD AND SYSTEM FOR EXECUTING THIRD-PARTY AGENT CODE IN A DATA PROCESSING SYSTEM

(71) Applicant: Travis T. Wilson, Alameda, CA (US)

(72) Inventor: Travis T. Wilson, Alameda, CA (US)

(73) Assignee: Travis T. Wilson, Alameda, CA (US)

( * ) Notice: Subject to any disclaimer, the term of this patent is extended or adjusted under 35 U.S.C. 154(b) by 13 days.

(21) Appl. No.: 14/612,149

(22) Filed: Feb. 2, 2015

(65) Prior Publication Data
US 2015/0220352 A1 Aug. 6, 2015

Related U.S. Application Data

(60) Provisional application No. 61/936,246, filed on Feb. 5, 2014.

(51) Int. Cl.
G06F 9/54 (2006.01)
H04L 29/08 (2006.01)
G06F 9/48 (2006.01)

(52) U.S. Cl.
CPC ............... H04L 67/10 (2013.01); G06F 9/48 (2013.01)

(58) Field of Classification Search
CPC .................................. H04L 67/10; G06F 9/48
See application file for complete search history.

(56) References Cited

U.S. PATENT DOCUMENTS

| 7,991,602 B2* | 8/2011 | Maturana | G05B 17/02 700/275 |
| 2003/0237076 A1* | 12/2003 | Tormey | G06F 17/5009 717/135 |
| 2009/0043996 A1* | 2/2009 | Breidenstein | G06F 9/485 712/228 |

OTHER PUBLICATIONS

Michael E. Goldsby, Multithreaded Agent-based Simulation, Nov. 2013, pp. 1-11.*
Gennaro Cordasco, Bringing together efficiency and effectiveness in distributed simulation: The experience with D-Mason, 2013, pp. 1-18.*

* cited by examiner

Primary Examiner — Syed Roni
(74) Attorney, Agent, or Firm — Blakely, Sokoloff, Taylor & Zafman LLP

(57) ABSTRACT

In one embodiment, agent routines are executed in a first thread, each agent routine being invoked by one of coroutines. A agent processor executes in a second thread the agents associated with the one or more agent routines, including receiving a first yield signal from a first of the coroutines indicating that a first of the agent routines yields to perform a first action that requires an action simulation, in response to the first yield signal, suspending the first coroutine, selecting a second of the coroutines from a head of a first agent queue maintained by the agent processor, and executing the second coroutine by assigning the execution lock to the second coroutine. In a third thread, a simulator simulates the first action on behalf of the first coroutine and signals the agent processor to resume the first coroutine after completing the simulation of the first action.

21 Claims, 10 Drawing Sheets

METHOD AND SYSTEM FOR EXECUTING THIRD-PARTY AGENT CODE IN A DATA PROCESSING SYSTEM

RELATED APPLICATIONS

This application claims the benefit of U.S. Provisional Patent Application No. 61/936,246, filed Feb. 5, 2014, which is incorporated by reference herein in its entirety.

FIELD OF THE INVENTION

Embodiments of the present invention relate generally to code execution of a data processing system. More particularly, embodiments of the invention relate to executing third-party agent code in a data processing system.

BACKGROUND

Traditionally, there has been considerable overhead for anyone who wants to get into an online gaming field by writing an agent. Some of the common uses of agents include agent-based modeling or simulations, which is usually of individuals in social scenarios. For example, such simulations include simulations of the classic Prisoner's Dilemma. To run the simulations, a user is required to install a software package on his local computer. To create an agent for use in the simulation, the user must write it in a specific programming language, sometimes a difficult programming language. If the simulation is competitive (e.g. Prisoner's Dilemma), the user runs his agent against agent(s) written by other authors. So, the user must seek out others who have written agents, and then trust that those agents do not threaten his computer system.

In video game simulations, video games providers often allow their users to write new game code ("mods") and link it to the game running on the user's computer. Users can write mods to customize the behavior of characters in the game, i.e. can write agents. However, a game requires extraordinary technical ability. It also exposes the user's computer to security risks if the user installs a mod from an untrusted party.

To submit an agent a user must write and deploy server software that communicates each move via a custom protocol when a central client program requests the agent's move. The same issues arise repeatedly: the user must have technical proficiency; the user must know a particular programming language; other users' agents are hard to find and insecure to run. In short, the user, who has an agent behavior in mind and wants only to put it into code and run it, is required to engage in a great deal of infrastructure. Such requirements are difficult for some users to develop and deploy.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
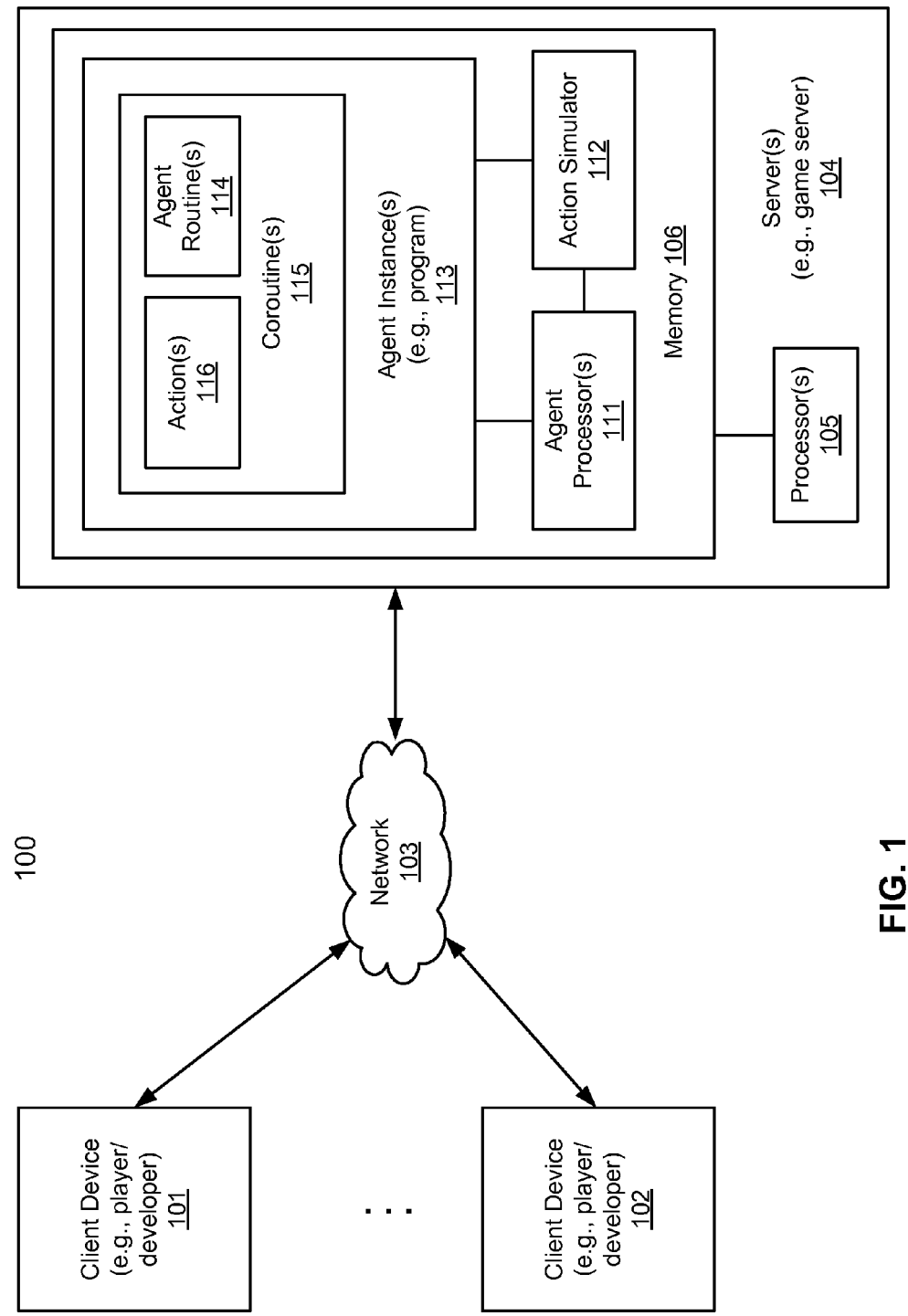
FIG. 1 is a block diagram illustrating a system for hosting and executing agent code according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an agent execution system or platform ("agent processor") is utilized, which runs the routines of multiple heterogeneous agent code libraries, equitably and securely, such that the agents can interact with a common simulation and with each other. Each agent code library represents an "agent" and each agent may contain one or more agent routines. The agent code may be developed or provided by different developers or vendors, which may be developed in the same or different programming languages. The agent code may also be developed or provided by different developers or vendors. The agent code may include coroutines that are provided by a simulation developer, instead of an agent author. Each agent routine may be executed in a separate thread; upon reaching an action that the simulation must simulate, the routine suspends itself until the action simulation is complete. The agent processor can return control to the routine at different time by maintaining the states of the corresponding threads. Each of the agent routines can be assigned or allocated with similar amounts of processing resources (e.g., central processing unit or CPU time, memory, storage, or networking) during the execution.

In one embodiment, an agent or agent routine is a program that operates autonomously in a given environment to realize a set of goals or perform tasks. Although an agent has a high level goal provided by its operator, the steps an agent takes to realize the goal are left up to the agent, which may employ arbitrarily sophisticated algorithms or other techniques to realize that goal. Examples of agents include controlling an airplane to win an air battle simulation, moving elevators in a building to efficiently deliver passengers to their floors, playing the Prisoner's Dilemma (a seminal non-zero-sum game in the field of game theory), playing poker, controlling each ant in an ant colony to maximize the colony's population, and controlling a tower in a tower defense game to maximize the player's score. The environment in which the agent acts is a world simulated in software, referred to herein as a "simulation" or "model." As seen by the examples above, simulations can range from simple multi-player card games to complex socio-economic or biological simulations. An agent is able to interact with the simulation by controlling a part of it; that part is referred to as an "actor."

FIG. 1 is a block diagram illustrating a system for hosting and executing agent code according to one embodiment of the invention. Referring to FIG. 1, system 100 includes, but is not limited to, one or more client systems 101-102 communicatively coupled to server system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired and/or wireless. Clients 101-102 may represent end users who access resources provided by server system 104 over network 103. Alternatively, clients 101-102 may represent developers or vendors who develop or provide agent code to be executed in system 104, where agent code can be developed using a variety of virtual-machine programming languages, such as Java™, Python™, etc.

Server system 104 may include or represent any type of server or a cluster of one or more servers (e.g., Web or cloud servers). For example, the agent code may be part of an online game hosted by server 104 as a game server, where the agent code may represent certain agents in a game or game simulation developed by various game developers. For the purpose of illustration, throughout this application, a gaming environment is utilized to demonstrate the embodiments of the invention described herein. However, embodiments of the invention can also be applicable to other situations.

According to one embodiment, server 104 includes one or more processors 105 (e.g., central processing units or CPUs) and memory 106 providing an execution engine or platform to execute agent code or agent routines. In one embodiment, one or more agent processors 111, an action simulator 112, and one or more agent instances 113 are executed from memory 106 by processor 105 to provide services to clients 101-102 over network 103. Server 104 may further include other components such as an operating system, local storage device, and network interface, etc.

According to one embodiment, each agent routine 114 is hosted and invoked by a coroutine 115. A coroutine, generally, is a computer program component that generalizes a subroutine for non-preemptive multitasking. As opposed to a thread, whose subroutine is suspended arbitrarily by a separate authoritative process, a coroutine allows a subroutine to determine when to suspend itself ("yield") and to allow another coroutine to resume. It is therefore well-suited to cooperative sharing of resources. Specifically, in this embodiment, agent routine 114 may invoke a function ("action" 116) that represents the behavior of an actor in the simulation; the action in turn invokes the coroutine 115 which hosts the agent routine 114, instructing it to yield. After simulator 112 indicates that the action is complete, agent processor 111 resumes coroutine 115. Coroutine 115 allows the action function to exit, for example by successfully returning, or by raising an exception. Agent routine 114 executes its next instruction. It may perform another action after the previous action has exited.

Multiple agent routines can be maintained by an agent instance logically representing an agent, which may be in a form of an agent library or agent object. Multiple agent instances (e.g., instances of the same agent or different agents) are hosted or managed by an agent processor or processing unit. An agent processor coordinates the execution of agent routines which represent an actor (e.g., a player of a game) or group of actors (e.g., a team of players in a game). There can be multiple agent processors managing their respective agent instances but any given agent may not be managed by multiple agent processors. In addition, simulator 112 is provided to simulate the action(s) 116 requested by agent routine(s) 114. In one embodiment, coroutine 115 and the associated agent routine 114, agent processor 111, and simulator 112 may be executed in separate threads interacting with each other, for example, through shared memory and/or an application programming interface (API). In one embodiment, agent processor 111 hosting agent instance(s) 113 may be running within one thread, while simulator 112 may be running in another thread.

When agent routine 114 hosted by coroutine 115 invokes action 116, action 116 determines whether it is a blocking action that requires a simulation performed by simulator 112. If the action is a blocking action, it sets up proper states in a corresponding action object to indicate a simulation is required. Coroutine 115 then suspends by yielding the control ("execution lock") to agent processor 111. While the initial coroutine is suspended, agent processor 111 then selects and resumes another coroutine which is waiting for resumption, (or if there are none, waits for a coroutine to indicate it is waiting for resumption). At some time thereafter, simulator 112 examines the actor to determine whether there is any pending action that requires simulation. In this example, simulator 113 detects that the actor represented by agent instance 113 has an action awaiting simulation. Simulator 112 performs the simulation for a period of simulated time. The action may or may not be completely simulated after this period. If the action is complete, simulator 112 indicates such completion status on the actor represented by agent instance 113. Thereafter, agent processor 111 resumes the suspended coroutine 115 to continue.

Note that some or all of the components as shown and described above (e.g., agent processor 111, action simulator 112, and coroutine 115) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2A:
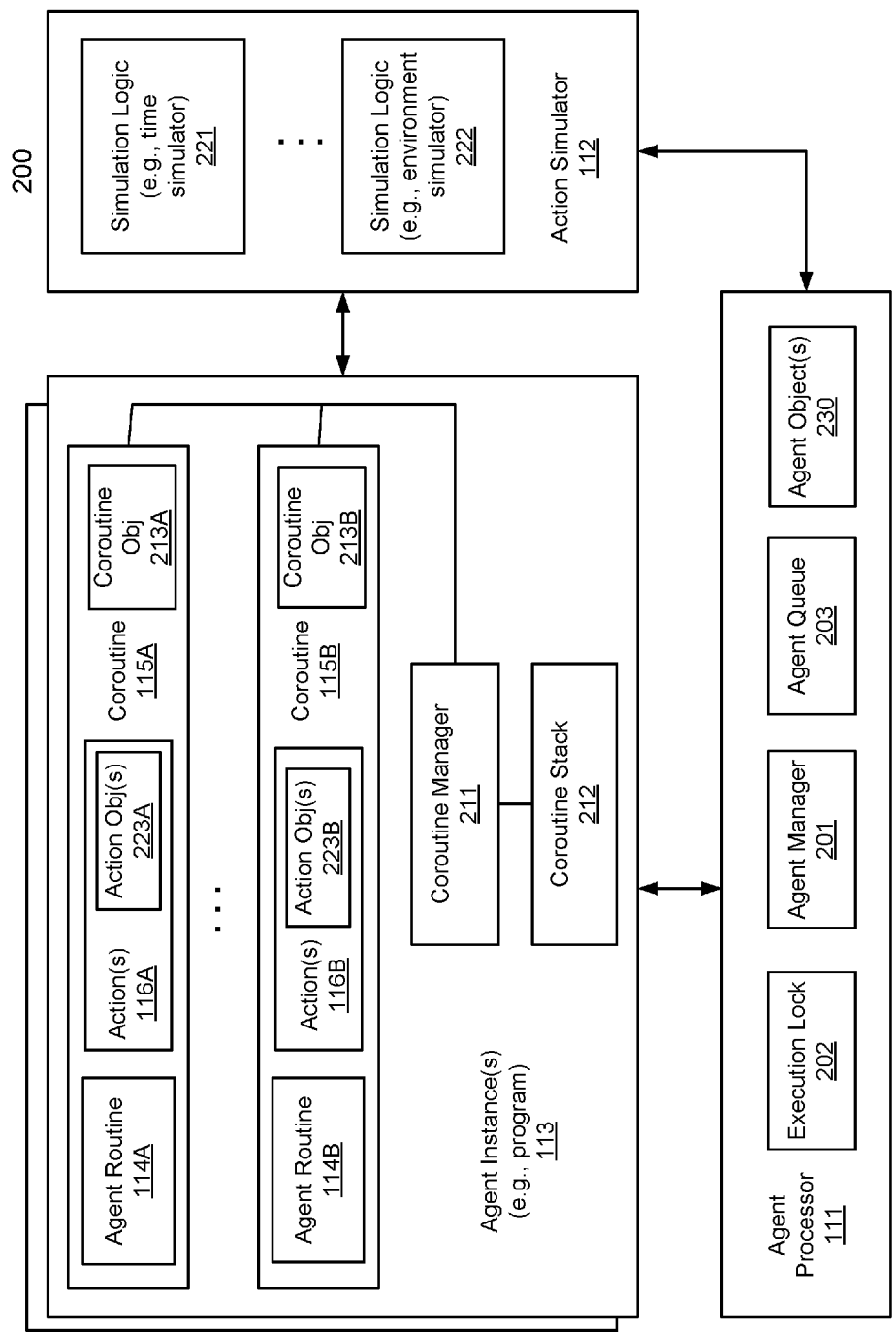
FIGS. 2A and 2B are block diagrams illustrating a system for executing agent code according to certain embodiments of the invention.

FIG. 2A is a block diagram illustrating a system for executing agent code according to another embodiment of the invention. System 200 may represent the system as part of server 104 of FIG. 1. Referring to FIG. 2A, as described above, agent processor 111 is responsible for processing or managing one or more agent instances 113 (also referred to as programs). Each agent instance 113 is associated with one or more coroutines 115A-115B. Each of coroutines 115A-115B hosts or invokes an agent routine such as agent routines 114A-114B. In one embodiment, the action functions called by each of agent routines 114A-114B may be implemented in software or hardware as an object or class in an object-oriented programming environment, which may be represented by action objects 223A-223B, respectively. Action objects 223A-223B may maintain certain data members to store certain states or information associated with the corresponding action. Action objects 223A-223B may further include certain function members or interfaces to perform certain operations or to provide an interface to allow an external function or object, such as agent processor 111, to access internal data or functions provided by the corresponding action.

An action object may include data members and function members. In one embodiment, an action includes a query function, such as a time forecast function, to allow an external routine to query an amount of time required to simulate the corresponding action, for example, by simulator 112, as well as other attributes or metadata associated with the action (e.g., type of action, speed of action, unit of work or time of the action, the result of the action, etc.).

In one embodiment, agent instance 113 (also simply referred to as an agent) includes a coroutine manager 211 configured to manage coroutines 115A-115B. Coroutine manager 211 may be responsible for communicating with or providing an interface to agent processor 111 and/or simulator 112 on behalf of coroutines 115A-115B, or vice versa. Agent instance 113 further maintains a coroutine stack 212 to store coroutine identifiers (IDs) identifying some of the coroutines 115A-115B when they are suspended and pending to resume, while other operations such as simulations or actions of another coroutine are being performed in another thread. Note that each of coroutines 115A-115B may be executed in a separate thread (e.g., first threads), also referred to as coroutine thread or agent routine thread since it hosts or invokes an agent routine. Agent processor 111 may be executed in a separate thread (e.g., a second thread) and simulator 112 may be executed in another thread (e.g., a third thread). These threads may be executed in parallel as part of a multi-threading operating environment.

In one embodiment, coroutine stack 212 is a first-in-last-out stack. An agent may indicate to the simulator 112 that it wants a certain agent routine, in this example, agent routine 114B (its "event handler") to be notified when a certain condition becomes true in the simulation (an "event"). When such an event occurs, the simulator 112 notifies the agent processor 111. The agent processor 111 introduces a new coroutine, in this example, coroutine 115B, which hosts the event handler routine. The agent processor 111 pushes this new coroutine, such as a coroutine identifier of the new coroutine, onto the top of coroutine stack 212 belonging to agent instance 113. When the agent processor 111 determines to give control to the agent instance 113, it examines the coroutine stack 212 and finds coroutine 115B on top; thus it resumes that coroutine 115B. When the agent routine 114B exits, the agent processor 111 removes its coroutine 115B from the coroutine stack 212.

In one embodiment, agent processor 111 includes an agent manager 201 for managing one or more agent instances 113. Each of agent instances 113 may be represented by a respective one of agent objects 230, whose pointers or addresses are maintained by agent processor 111. Agent processor 111 also maintains an agent queue 203 to store agent instance identifiers (e.g., pointers of agent objects 230) pending to be processed or executed by agent processor 111. Although agent processor 111 may manage multiple agent instances 113 and/or coroutines 115A-115B, only one of the coroutines 115A-115B of one of agent instances 113 is active. That is only one of coroutines 115A-115B can be actively executed at a time per agent processor 111, while the remaining coroutines are in a suspension or sleep mode. Each of coroutines 115A-115B assigned or allocated with execution lock or execution token 202, which represents the right to performed or be executed at the point in time. Each of coroutines 115A-115B is allocated with a similar set of processing resources (e.g., CPU time, memory, time slot for execution) by agent processor 111.

In one embodiment, for the purpose of illustration, when coroutine 115A invokes agent routine 114A and agent routine 114A calls action 116A to be performed, coroutine 115A determines that action 116A may be a blocking action that requires a stimulation. An action may be designed or developed by a developer or vendor associated with the simulation. A blocking action is a function call in an agent routine which is expected not to return immediately; it represents a simulated action that will take simulated time to complete, and the function call will not return until that action's simulation is complete, for example, to simulate that the "action" is taking time to perform. In other words, the agent routine cannot proceed until the action is simulated, so the simulation of the action blocks the agent routine. If it is determined that action 116A is a blocking action, coroutine 115A sets up the necessary information such as states in corresponding agent instance 113 (or, its actor) indicating that there is a pending action that requires a simulation. Thereafter, coroutine 115A yields the control back to agent processor 111, which in turn selects and executes another coroutine.

Meanwhile, simulator 112 runs its simulation in short intervals of simulated time. In each interval starting at simulated time A and ending at simulated time B: the state of each simulated object is updated, from its state as of time A to its state at time B. The actor represented by each agent instance is a simulated object. For each actor, simulator 112 performs the necessary simulation according to the specific action or actions, which may be specified in an action object of each action. For example, an attribute of an action object may specify the type of the action that may be used to indicate that the corresponding action requires a simulation, as well as how the corresponding simulation should be performed. Once the simulation of a particular action of a particular coroutine is completed, simulator 112 informs agent processor 111 by adding an identifier of agent instance (or, the actor) into the tail of agent queue 203. In one embodiment, agent queue 203 is a first-in-first-out (FIFO) buffer. As described above agent processor 111 is running in a separate thread, referred to an agent processor thread. When a coroutine yields, it wakes up agent processor 111. Agent processor 111 then selects a coroutine that is pending from the head of agent queue 203 and resumes or executes the selected coroutine.

Figure 2B:
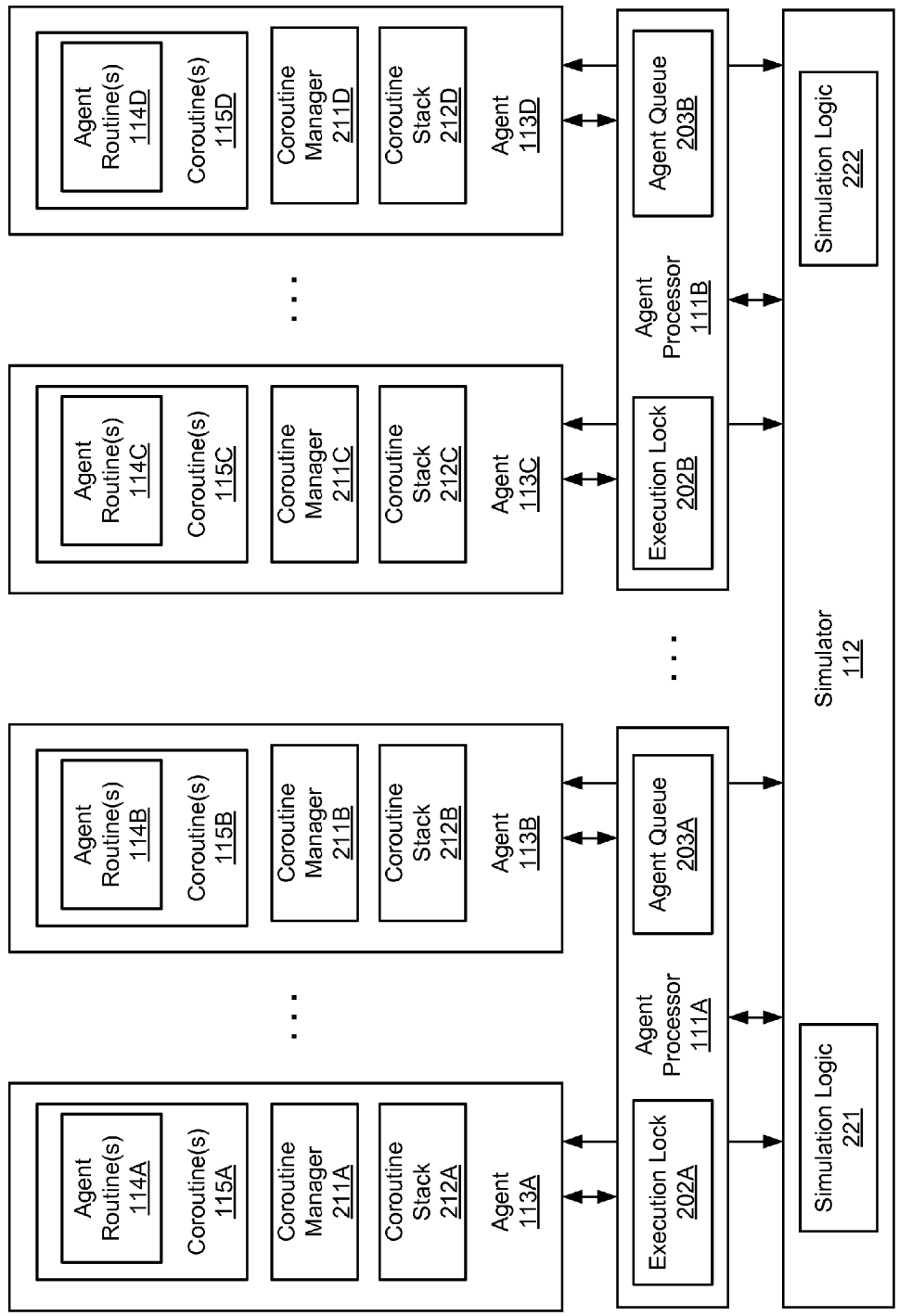

Note that as shown in FIG. 2B, there may be multiple agent processors 111A-111B, each managing multiple agent instances (e.g., agent instances 113A-113D). Each agent instance represents or manages multiple coroutines (e.g., coroutines 115A-115D) hosting their respective agent routines (e.g., agent routines 114A-114D). Each agent instance maintains its own coroutine stack (e.g., coroutine stacks 212A-212D) and coroutine manager (e.g., coroutine managers 211A-211D). Similarly, each agent processor maintains its own agent queue, agent manager, and execution lock or execution token. Each agent processor represents an actor or player or alternatively, a group of actors or team of players.

Also note that in an object-oriented programming environment, each of the components as shown in FIGS. 2A-2B may be associated with a data structure such as an object or class. Each object includes certain data members and function members to implement its functionalities and to maintain its states or attributes or metadata. For example, each of agents 113A-113D is associated with an agent object having a list or array of coroutines hosted therein and its associated coroutine stack. The agent object may further include a function member representing an associated coroutine manager. Similarly, an action has its action object; a coroutine has its own coroutine object; an agent processor has its own agent processor object, etc. Some of these objects may maintain the addresses of other objects for accessing.

Figure 3:
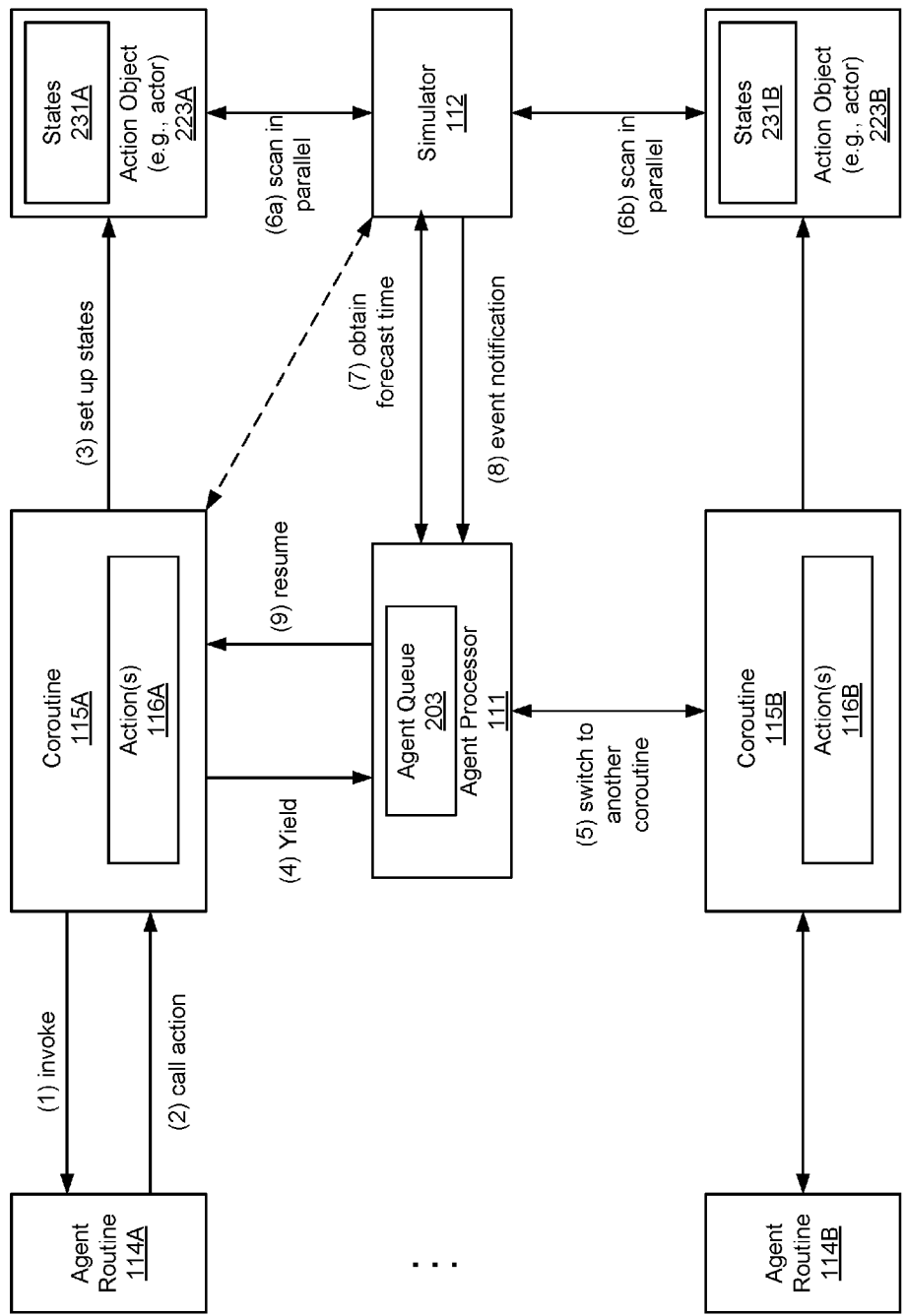
FIG. 3 is a transactional diagram illustrating certain transactions of an agent execution platform according to one embodiment of the invention.

FIG. 3 is a transactional diagram illustrating certain transactions of an agent execution platform according to one embodiment of the invention. System 300 may represent any of the systems as shown in FIGS. 2A-2B. Referring to FIG. 3, for the purpose of illustration, it is assumed coroutine 115A obtains an execution lock or token from agent processor 111 for execution. Coroutine 115A invokes agent routine 114A via path (1). Agent routine 114A in turns calls action 116A to be performed via path (2). Note that agent routine 114A, coroutine 115A, and action 116A may be developed by the same or different developers or vendors. In response, assuming action 116A is a blocking action that requires a simulation, coroutine 115A sets up states 231A of its corresponding action object 223A via path (3). Thereafter, coroutine 115A yields the processing control to agent processor 111 via path (4), for example, by releasing the execution lock. Objects 213A-213B represent actions performed by actors, where an action and its actor are both state shared between simulator 112 and the agent code.

In one embodiment, agent processor 111 may be executed in a separate thread with respect to simulator 112. By releasing the execution lock or token back to agent processor 111, it wakes up agent processor 111. In response, agent processor 111 selects a next coroutine that has been pending for resumption from the head of agent queue 203; or, if no coroutine is pending resumption, the agent processor waits until a coroutine is inserted into the agent queue 203. Agent queue 203 is utilized to prioritize the pending coroutines, which a coroutine near or at the head of agent queue 203 has a higher priority than the one located at or near the tail of agent queue 203. Assuming the next coroutine is coroutine 115B, which is located at the head of agent queue 203. In this example, agent processor 111 retrieves an identifier (e.g., address, handle, or pointer of a corresponding coroutine or coroutine object) of coroutine 115B from agent queue 203, and executes or causes coroutine 115B to be executed by assigning the execution lock to coroutine 115B. Note that although not shown, coroutine 115B operates in a manner similar to coroutine 115A. For example, coroutine 115B has the same relationship as 115A; i.e. instead of a different path (5), it may have paths (4) Yield and (9) Resume just like coroutine 115A. In one embodiment, coroutine 115B may have previously yielded, for example, by a blocking action. By assigning the execution lock, agent processor 111 indicates that the action has completed thus is no longer blocking. It wakes up coroutine 115B so that coroutine 115B can resume.

Meanwhile, according to one embodiment, simulator 112 (which is executed in another thread) runs its simulation in short intervals of simulated time and updates (either through shared memory or a specific API call) all of the coroutine objects, in this example, coroutine objects 213A-213B associated with coroutines 115A-115B. For example, simulator 112 examines states 231A-231B of action objects 223A-223B to determine which of the actions of the coroutines require simulation. As described above, prior to yield, a coroutine has set up its states as well as other information in the action object to indicate that a simulation of an action is needed. For those actions that require simulation, simulator 112 performs the necessary simulation for the specific action or actions. Optionally via path (7), simulator 112 communicates with each action object, in this example, action 116A, to obtain any specific information concerning the associated simulation. Alternatively, simulator 112 communicates with the corresponding coroutine hosting the action for the simulation information. For example, simulator 112 may obtain the amount of time for the simulation for action 116A. Note that each action may have different parameters, such as an amount of time to simulate how long that particular action takes.

Once the simulation is completed, simulator 112 signals the end of an action by writing that information to the action 213A or its associated actor. However, simulator 112 also talks to agent processor 111 via path (8) when there is a simulated "event." In one embodiment, simulator 112 calls an API provided by agent processor 111 for an event notification by passing an event identifier identifying the event. In response, based on the event identifier, agent processor 111 determines which of agents corresponding to coroutines 115A-115B are interested or have registered to receive event notification of that particular event. In one embodiment, an agent or agent object includes an attribute or data member storing information indicating which of the events the corresponding agent is interested in receiving a notification.

In response to the event notification, agent processor 111 spawns a new coroutine to invoke an agent routine that has been specifically configured to handle an event (e.g., event handler). In addition, agent processor 111 pushes or causes the corresponding agent to push a coroutine identifier of the new coroutine into the top of a coroutine stack of the corresponding agent object. Once the new agent routine completes the event handling, the associated coroutine identifier is then popped from the coroutine stack, such that the previously suspended coroutine can resume accordingly.

Subsequently, agent processor 111 receives the execution lock, for example, released or yielded from coroutine 115B via path (9). In response, agent processor 111 retrieves a coroutine identifier from the head of agent queue 203, in this example, coroutine 115A. Agent processor 111 then wakes up coroutine 115A to resume by assigning the execution lock to it via path (10).

In one embodiment, an agent routine invoked in response to an event may raise an "abort" signal by calling a special "abort" function on the agent's actor object (e.g., an abort function of a corresponding agent instance object). The abort signal indicates that all other agent routines which belong to the same agent and which currently block on an action function, should disengage from their action function as soon as possible regardless of whether the action's simulation has been completed. In response to the abort signal, the agent processor is configured to examine or walk through the list of coroutines that have been pending in the corresponding coroutine stack of the agent to inform each coroutine that an abort signal has been raised or an abort event has occurred.

In one embodiment, in response to the abort signal, agent processor selects each coroutine in the agent's coroutine stack, starting with the routine directly below the routine which raised the abort, and continuing down to the routine at the bottom of the stack. For each coroutine, the agent processor sets an abort marker in the coroutine (e.g., an attribute of a coroutine object). Thereafter, when each coroutine is granted the execution lock, it checks for an abort marker. If the abort marker exists or is set to a predetermined value, the coroutine clears the marker and immediately exits the action function by raising an "abort" exception. This returns the control to the agent routine, which is expected to handle the abort exception by an event handler of the agent routine. In this way, all agent routines hosted in the agent's coroutine stack stop blocking on their action functions as soon as possible, and have a chance to respond to new information introduced by the original event.

Action simulations, for example, for game actions, can be a variety of simulations. One of the common action simulations is to simulate an amount of time an action is required to take or perform. In one embodiment, when the simulator is to perform a time simulation, the simulator communicates with each of the actions or coroutines pending for simulations to determine the specific amount of simulation time and to calculate the minimum simulation time interval or increment amongst all pending actions. From this information, and from other functions (for example, prediction of collision between two simulated actors, which would trigger agent notification of an event), the simulator calculates the best amount of time it can simulate without agent interaction. For example, this might be the most possible simulated time before an agent would be notified of an event, and before any current action completes. During each scanning period or iteration of the simulation thread, the minimum simulation time interval may decrease for each action, such that each of the actions can age out or expire at different time based on the specific type of the actions or a time requirement of the actions. Note that in this example as shown in FIG. 3, a coroutine yields to give up the execution control back to agent processor 111 voluntarily. In another embodiment, agent processor 111 may further include monitoring logic to monitor the operations of the coroutines 115A-115B. If a certain condition occurs (e.g., holding the execution lock too long), agent processor 111 may interrupt or terminate the coroutine to regain the execution lock.

Figure 4:
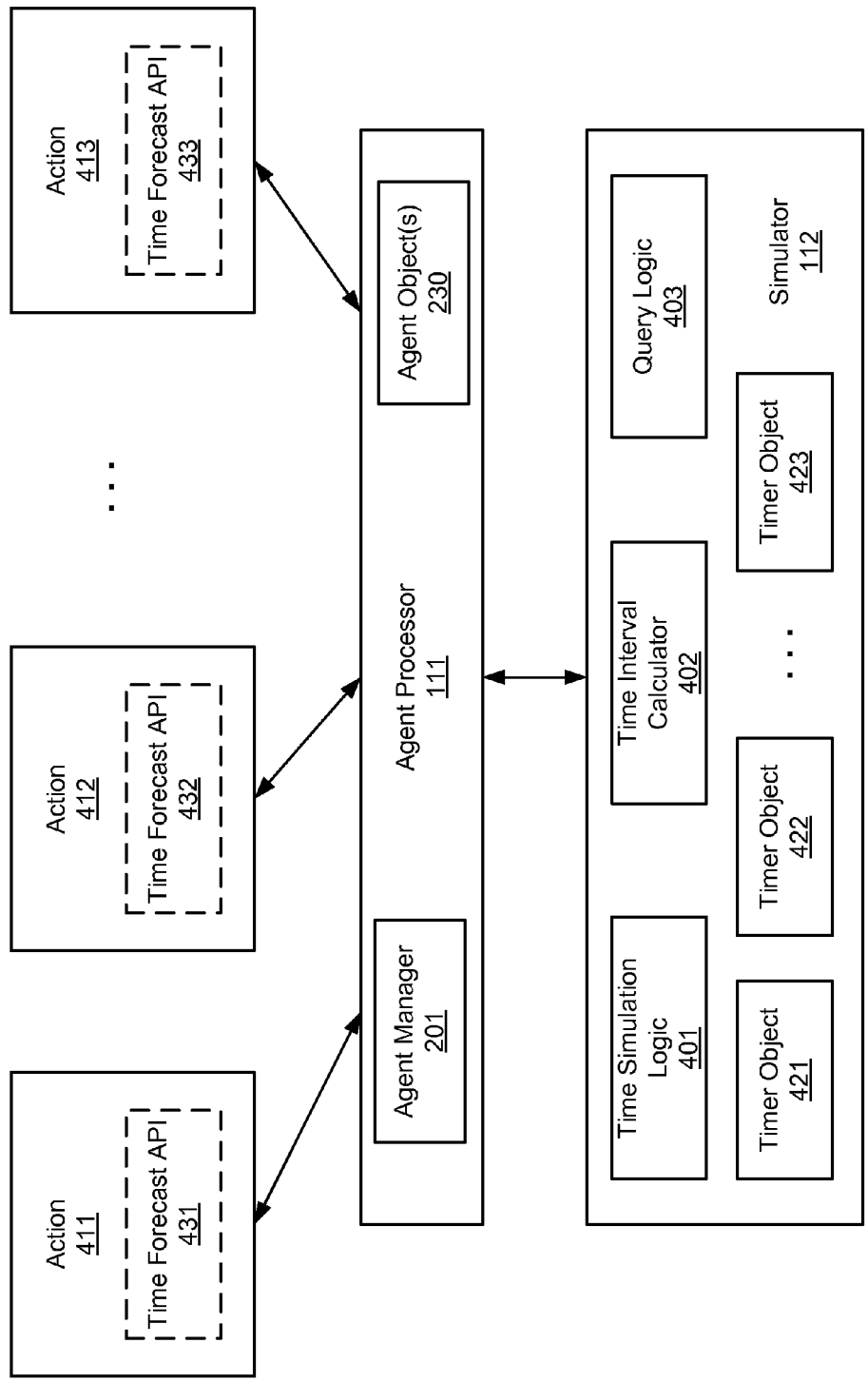
FIG. 4 is a block diagram illustrating a simulation mechanism according to one embodiment of the invention.

FIG. 4 is a block diagram illustrating a simulation mechanism according to one embodiment of the invention. Referring to FIG. 4, simulator 112 includes, amongst others, time simulation logic 401, time interval calculator 402, and query logic 403. Query logic 403 is configured to query actions 411-413 to determine what actions to simulate. According to one embodiment, each of actions 411-413 is associated with or maintains a timer object such as timer objects 421-423 and a time forecast API such as APIs 431-433. When a coroutine receives a blocking action request and prior to yielding, the coroutine sets up the action states for simulation. In response, simulator 112 sets a timer object to indicate an amount of time required for the simulation for that particular action. In one embodiment, for each of the actions pending for an action simulation, simulator 112 maintains a timer object, in this example, timer objects 421-423 corresponding to actions 411-413 respectively.

According to one embodiment, query logic 403 queries via agent processor 111, which in turn communicates with actions 411-413 via APIs 431-433, from actions 411-413 to receive the required simulation time, assuming in this example all actions 411-413 require an action simulation. Once the simulation time is received from each of actions 411-413, according to one embodiment, time interval calculator 402 calculates the minimum time interval amongst all simulation time of actions 411-413. For example, it is assumed that simulator 112 sets up timer object 421 having 5 second simulation time, while timer object 422 has 10 seconds and timer object 423 has 15 seconds. The minimum time interval would be 5 seconds. Accordingly, for the current scanning or inspection period, time simulation logic simulate 5 seconds and deducts or decrements the minimum time interval, in this example 5 seconds, from each of the timer objects 421-423. It is assumed that 5 seconds is enough simulated time to complete action 411 to complete, so when the time interval is simulated, simulator 112 will determine that action 411 is complete. Simulator 112 updates or sets its timer 421 to zero, sets its state to indicate completion, and notifies the agent processor 111 to resume the coroutine which yielded on the action 411. In addition, an identifier of a coroutine corresponding to action 411 or an identifier of an agent instance associated with the coroutine will be inserted into agent queue of the corresponding agent processor to resume subsequently as described above. On the next iteration, query logic 403 will query again and time interval calculator 402 will recalculate the minimum time interval since action 411 has already completed, and there may be an additional action requiring simulation and its simulation time may be different.

In another example, timer objects 421-423 may all have 5 seconds remaining, but the time interval calculator 402 may determine that after 2 seconds of simulated time, an event will occur, for example two simulated actors may collide with each other, or a new interesting object may be introduced into the simulation. For example, to predict a collision event, collision logic in the simulator analyzes the trajectories of simulated moving actors and reports that two actors will collide in two seconds. If any agent has requested to be notified of the event, then the simulation interval is set to 2 seconds. The 2-second interval is simulated, and then the simulator notifies the agent processor of the event, for example, via an API for notification purpose with an event identifier that identifies a specific event. In response, the agent processor spawns one or more new coroutines, each of which runs an agent routine. Each agent routine may introduce a new action to be queried for its time forecast.

Figure 5:
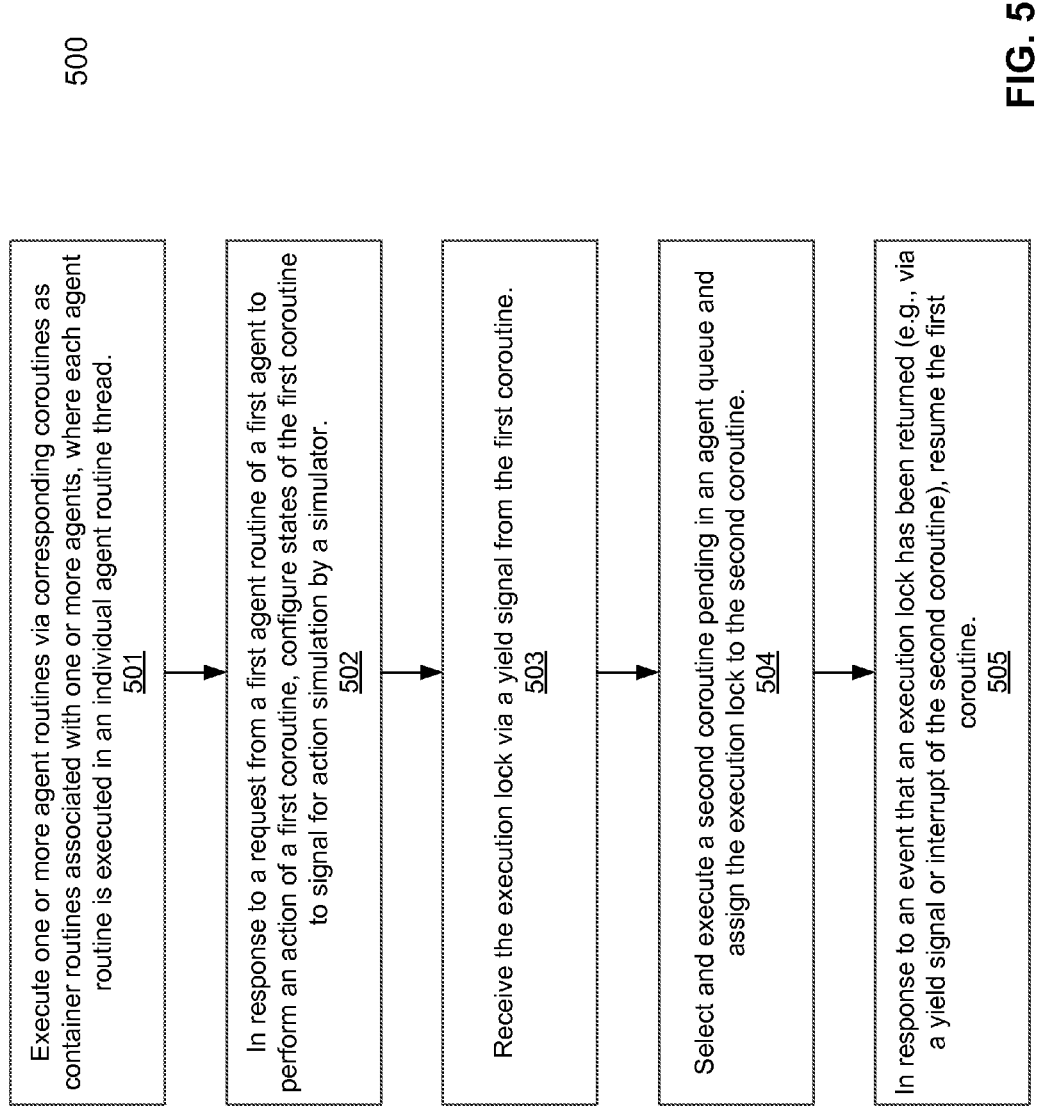
FIG. 5 is a flow diagram illustrating a method or process for executing agent routines according to one embodiment of the invention.

FIG. 5 is a flow diagram illustrating a method or process for executing agent routines according to one embodiment of the invention. Process 500 may be performed by processing logic which may include software, hardware, or a combination thereof. For example, process 500 may be performed by an agent processor executed in an agent processor thread as described above. Referring to FIG. 5, at block 501, processing logic executes one or more agent routines. Each agent routine is hosted by a coroutine, which may be executed in an individual thread (e.g., a coroutine thread) or which may share a thread with other such coroutines (e.g., an agent processor thread). At block 502, in response to a request from a first agent routine of a first agent to perform an action, processing logic configures states of the action to signal for an action simulation by a simulator. The simulator may be executed in a separate thread (e.g., a simulation thread). The simulator may change the state of the action, and the state of the actor representing the agent, in accordance with its simulation. At block 503, the first coroutine yields its execution lock. At block 504, processing logic selects and executes a second coroutine pending in an agent queue and assigns the execution lock to the second coroutine. At block 505, under the conditions that 1) the action has completed or failed, and 2) that an execution lock is released or returned, the processing logic resumes the first coroutine.

Figure 6:
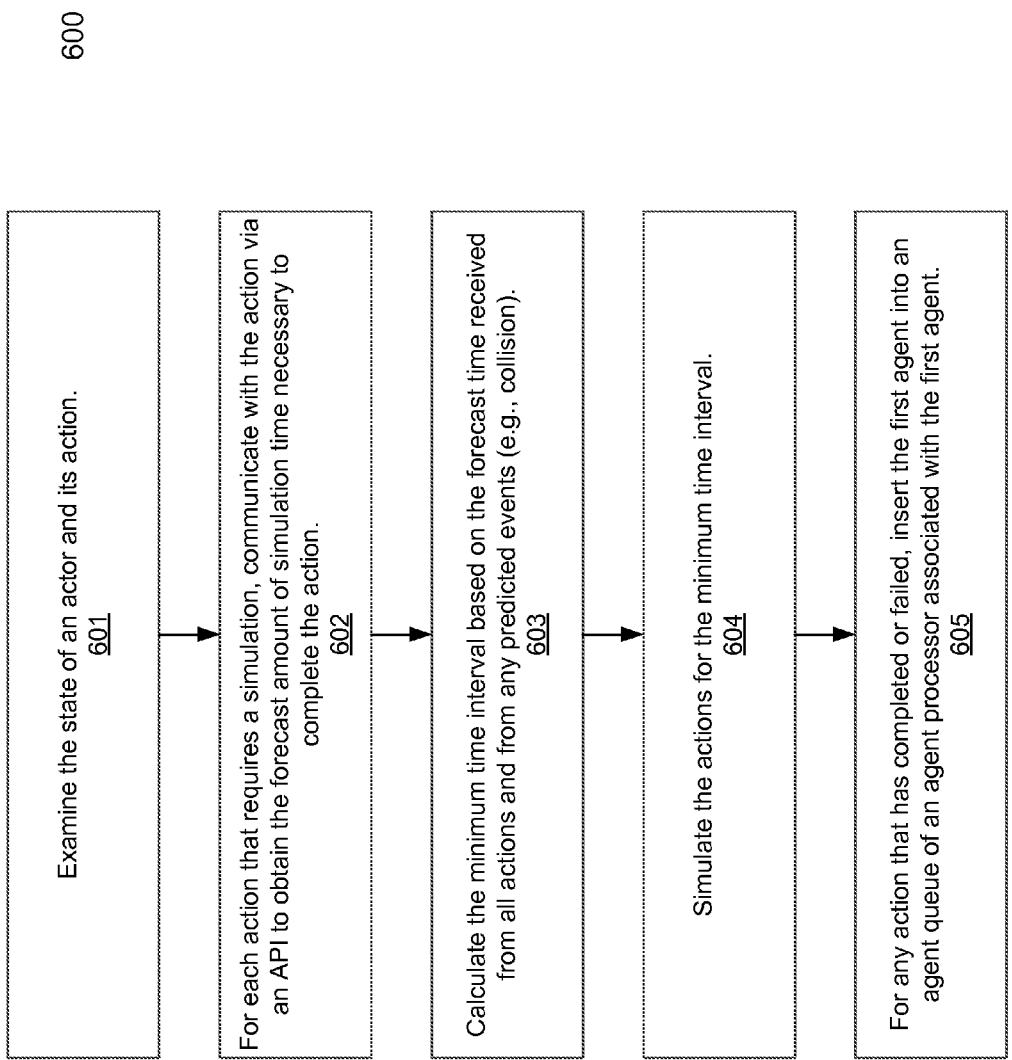
FIG. 6 is a flow diagram illustrating a method or process for executing agent routines according to another embodiment of the invention.

FIG. 6 is a flow diagram illustrating a method or process for executing a simulation according to another embodiment of the invention. Process 600 may be performed by processing logic which may include software, hardware, or a combination thereof. For example, process 600 may be performed by a simulator executed in a simulation thread as described above. Referring to FIG. 6, at block 601, processing logic examines the states of each actor and their actions. At block 602, for each of the actions that require simulation, processing logic communicates with the action object via an API to obtain forecast time required for the simulation. At block 603, processing logic calculates the minimum time interval based on the forecast time received from all the actions for the corresponding agent. At block 604, processing logic simulates the action for the minimum time interval. At block 605, for any action that has completed or failed, insert the action's agent into the tail of an agent queue of an agent processor associated with the first agent for resumption.

Figure 7:
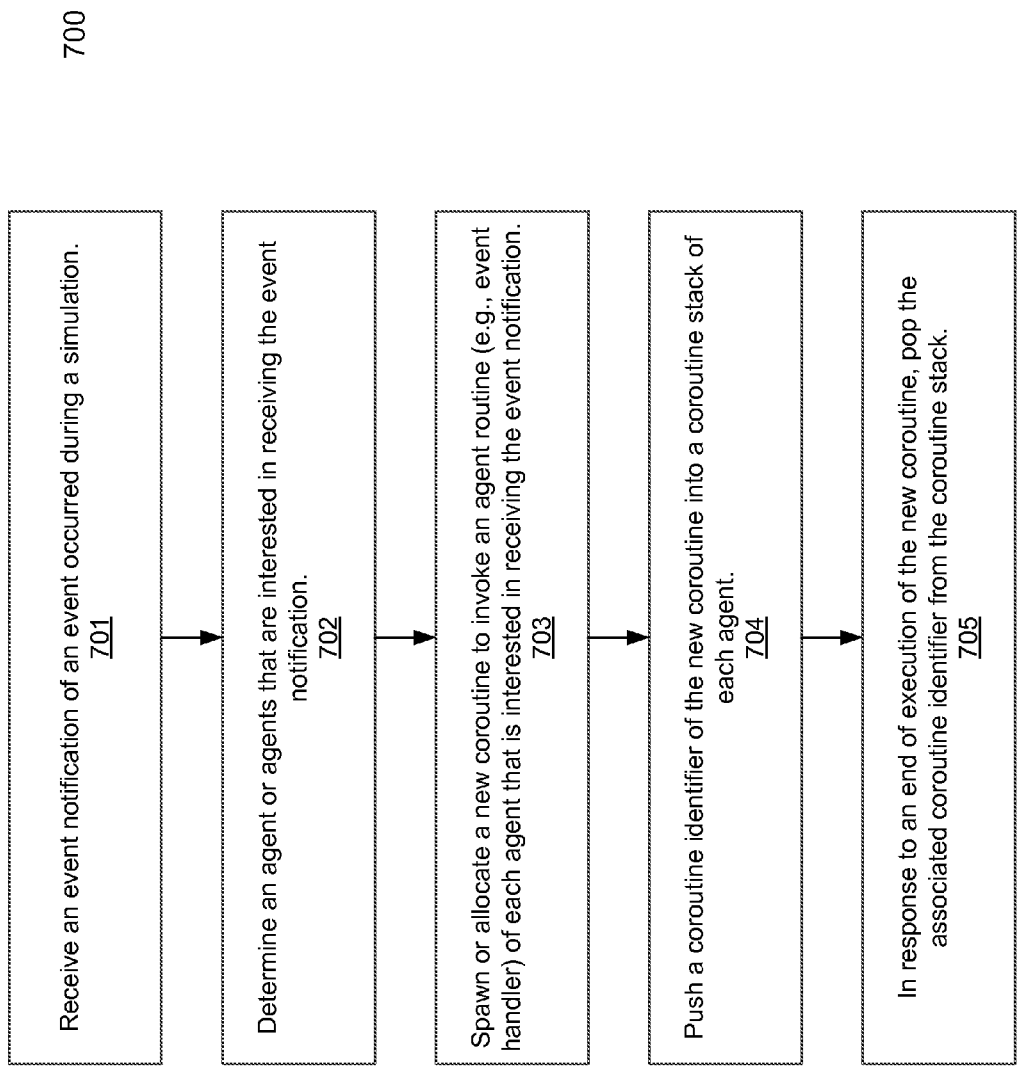
FIG. 7 is a flow diagram illustrating a method or process for executing agent routines according to another embodiment of the invention.

FIG. 7 is a flow diagram illustrating a method or process for executing agent routines according to another embodiment of the invention. Process 700 may be performed by processing logic which may include software, hardware, or a combination thereof. For example, process 700 may be performed by an agent processor executed in an agent processor thread as described above. Referring to FIG. 7, at block 701, processing logic receives an event notification of an event that occurred during a simulation. The event notification may be received from a simulator via an API. In response to the event notification, at block 702, processing logic determines an agent or agents that are interested in receiving the event notification. In one embodiment, the processing logic may look up in an event registry to determine which of the agents has registered to receive a notification of a particular event. Alternatively, processing logic may communicate with each agent via an API or examine a particular attribute of an agent object of each agent to determine whether a particular agent is interested in receiving the notification. At block 703, for each agent that is interested in receiving the event notification, processing logic spawns or creates a new coroutine to host and invoke an agent routine that is responsible for handling the event notification (e.g., an event handler of an agent). At block 704, processing logic pushes or causes the associated agent to push a coroutine identifier of the new coroutine into the top of a coroutine stack of the agent. At block 705, in response to an end of the execution of the new coroutine, processing logic pops the corresponding coroutine identifier from the coroutine stack of the corresponding agent, such that a previously suspended coroutine can resume.

The techniques described throughout this application can be applied to a variety of situations. One of them can be a gaming application. As a gaming platform provider or designer, you may want to design a simulation ("sim"), e.g., a game. The sim code performs operations to: 1) simulate objects interacting with each other and with the simulated environment; 2) administer the rules of a game, etc. A game designer would want to allow other people ("users") to write code (e.g., agent code) which can make decisions and control certain objects (e.g., actors) in the game. Although the agent decides what to make the actor perform an action, the sim determines whether the actor can legally perform that particular action, how long it takes, and what effect it has on the rest of the simulation. The agent code runs in real time along with the sim. The game designer would want to run many agents from many sources (e.g., different agent code developers) at the same time, and would want to run them all in the game designer's hosted software environment.

For example, according to one implementation, an API is provided to users as follows:

```
interface WorkerAgent { // user implements this
    void run( ); // this is an agent routine
}
interface LunchtimeListener { // user implements this
    void lunchtime( ); // this is another agent routine
}
interface WorkerActor { // agent code calls this
    void work(task_size);
    void eat(lunch_size);
    void abort( );
}
```

In this example, the user implements run( ) and lunchtime( ) so that they call actions on the actor:

```
class MyWorkerAgent implements WorkerAgent, LunchtimeListener {
    WorkerActor actor;
    boolean quits_after_lunch = false;
    boolean ready_to_quit = false;
    public void run( ) {
        while ( ! ready_to_quit) {
            try {
                actor.work(6);
                actor.work(12);
                ready_to_quit = true;
            } catch (ActionAborted exc) {
                // Fall to the end of the loop and start again. This
                // lets us check to see whether we should quit.
            }
        }
        // Quitting time! Exit.
    }
    public void lunchtime( ) {
        actor.eat(5);
        if (quits_after_lunch) {
            ready_to_quit = true;
        }
    }
}
```

The question is how someone can implement the actor so that: 1) the action invocations block for the amount of time it takes to simulate the action; and 2) the sim can let the agent know events in the meantime and let the agent respond while it's blocking on another action. Each instance of WorkerAgent is assigned a program or agent instance, which may be a data structure that represents the execution of one or more agent routines on behalf of the agent instance. The program embodies some functions of a coroutine and some functions of an event handler.

In one embodiment, the simulation is running in one or more threads of execution, and the agent is running in any number of separate threads as described above. However, at most one agent thread runs at a time. Each agent should be allocated with roughly the same amount of processor time to make its decisions. However, in simulations or games where multiple agents cooperate on the same team, each team should obtain roughly the same amount of processor time. An agent processor represents a pool of processing resources such as processor time. Agents spend most of their time performing actions (e.g., "acting"). While they are doing the actions, the action call in the agent code is blocking. Eventually the call returns and the agent must spend time in deciding what to do next (e.g., "thinking"). It is assumed that thinking lasts a small amount of time, relative to acting. Within each agent processor, only one program or agent instance at a time is given programming resources for thinking. This permission, i.e., an execution lock, is passed amongst all coroutines in all programs that belong to a single agent processor. Thus, all agent routines are inactive (their threads are suspended) except for the one which holds the execution lock. The agent processor's job is to give the execution lock to a program which is ready to do some thought.

According to one embodiment, as described above, there are at least three threads running in parallel: 1) an agent routine thread, which runs agent code; 2) an agent processor thread, which determines who gets the execution lock; and 3) a simulation thread, which carries out the effects of the agents' decisions.

Within an agent routine thread, according to one embodiment, following operations may occur dependent upon the specific game design. The first operation is to represent, create, or allocate the action as a stateful object, where an action is represented or associated with an action object.

action=new WorkAction(task_size);

The agent routine thread then identifies the coroutine whose thread has invoked "actor.work( )." The agent instance or program maintains a stack of coroutines, such that the currently running thread always corresponds to the "top" (most recently added or pushed) coroutine on the stack. Coroutines are added to the stack as part of "Event response," below.

coroutine=program.coroutines.peek( );
coroutine.command=action;

In this example, "program.coroutines.peek( )" is a function member of the corresponding program or agent instance that returns a handle or pointer of a coroutine sitting on the top of the coroutine stack. In one embodiment, "program-.coroutines.peek( )" pops and returns the handle or pointer of the coroutine from the coroutine stack. The agent routine thread then registers this new action with the simulation's timer. This will be utilized or examined by a simulation thread as described above for simulation.

timer.inputs.add(action);
timer.signal( ); // (notify it there's new information)

This agent has held the execution lock that is shared by other agents of the same agent processor, and the execution lock can be returned to the agent processor now. Remember that the work( ) method blocks for some time; this is where the block happens.

agentProcessor.coroutine.signal( );
coroutine.yield( );

In this example, "agentProcessor.coroutine.signal( )" wakes up the corresponding agent processor and "coroutine.yield( )" releases the execution lock and processing control. The sim runs in another thread (e.g., simulation thread), continually updating the action until it is done, aborted, or failed, or until the entire program is terminated. This thread eventually resumes. The processing logic of the thread will check for exceptional conditions.

```
If (program.terminated) { // set by simulation
    throw new ProgramTerminated( );
}
if (coroutine.abort != null) { // set by another coroutine in the same
program
    ActionAborted abort = coroutine.abort;
    coroutine.abort = null;
    throw abort;
}
if (coroutine.interrupt != null) { // set by simulation
    ActionFailed failure = coroutine.interrupt;
    coroutine.interrupt = null;
    throw failure;
}
```

The work( ) method exits, and the next line in the agent routine can be executed.

In one embodiment, a special method abort( ) is also implemented for an agent to call. This registers an abort on all the coroutines in the program or agent instance, so that an agent routine pending high in the coroutine stack (responding to a more recent event) can invalidate other routines pending lower in the coroutine stack (responding to older events). In that case the lower pending routines do not spend any more sim time executing, and they do not complete. This communication is across all coroutines. One coroutine is aborted due to another coroutine that has ordered the abort (via the following function, which sets flags on the aborted coroutine and queues it for resumption):

```
void abort( ) {
    for (coroutine in program.coroutines) {
        coroutine.abort = new ActionAborted( );
        coroutine.command = null;
        agentProcessor.coroutine_queue.add(coroutine);
        agentProcessor.signal( );
    }
}
```

An agent processor, which is running in an agent processor thread, manages all the coroutines from one or more agent instances or programs. It shares an execution lock or token with its agent routines, and alternately runs its own management logic, then runs an agent routine until the agent routine yields, then runs its own management logic again, etc. In one embodiment, an agent processor thread is shown as follows:

```
while (agentProcessor.is_running) {
//1. Get a coroutine that is ready to make a decision.
    coroutine = agentProcessor.coroutine_queue.remove( );
    // The coroutine must have not already ended, and must be the
    top
    // coroutine on its program's coroutine stack. If it doesn't meet
    // these criteria, keep going until you get one that has does.
    while (coroutine.has_ended ||
    coroutine.program.coroutines.peek( )) {
        coroutine = agentProcessor.coroutine_queue.remove( );
    }
    if (coroutine == null) {
        // Then all agents are considered to be doing actions.
        Restart
        // the loop when the coroutine_queue is populated.
        sleep_until_signalled( );
        continue;
    }
//2. Give up the execution lock to that coroutine.
    coroutine.active = true;
    coroutine.signal( );
    agentProcessor.coroutine.yield( );
}
```

It is in the best interest of each agent to think quickly and yield the execution lock as soon as possible, so that other coroutines and other agents on its team can be effective. According to one embodiment, the system may spawn an additional monitoring thread, which does not require or share the coroutines' execution lock, from the agent processor. That monitor tracks how long each coroutine holds the lock. If the time exceeds a first predetermined threshold the monitor warns it (by setting a flag on the agent object), and if it exceeds a second (e.g., higher) threshold the monitor forcibly terminates the coroutine. Such a monitoring logic may be a global monitoring logic shared by all agent processors. Alternatively, each agent processor maintains its own monitoring logic for monitoring the coroutines it manages. For example, the monitoring logic may be implemented as part of an agent manager of an agent processor.

As described above, the simulation itself runs in another thread. It simulates the progress and result of each actor's action as time moves forward in the simulation. Let's use the WorkAction example, where of course the logic is trivial, but it tracks time and the effect of the work:

```
class WorkAction {
    WorkAction(long task_size) {
        this.speed = 1.0; // one unit of work per second
        this.work_remaining = task_size;
        this.current_time = timer.currentTime( );
    }
    ActionResult act(long sim_seconds) {
        work_units = sim_seconds * this.speed;
        if (work_units < this.work_remaining) {
            this.work_remaining -= work_units;
            this.current_time += sim_seconds;
            return STILL_WORKING;
        } else {
            seconds_used = this.work_remaining / this.speed;
            this.work_remaining = 0.0;
            this.current_time += seconds_used;
            return COMPLETED_IN(seconds_used);
        }
    }
    long forecastEndTime( ) {
        return this.current_time + (this.work_remaining / this.speed);
    }
}
```

This design lets the system run the simulation timing in a valuable way, where a game designer does not have to quantize time into equally-sized intervals. Instead the game designer can compute each interval so that it is as long as possible, and yet it ends exactly when an agent's action is complete. In other words, the simulation advances its clock along the vertices of each action's start time and end time, not by a fixed interval. The simulator can call each action's forecastEndTime( ) to determine how long each action is expected to take.

According to one embodiment, the simulator first calculates the length of time that the simulation can run by itself with all agents acting and none thinking.

```
interval_start = previous_interval_end;
interval_end = interval_start + maximum_interval;
while ( ! timer.inputs.isEmpty( )) {
    action = timer.inputs.remove( );
    interval_end = Math.min(interval_end, action.forecastEndTime( ));
}
```

This calculation is deterministic, because by definition no agent can think until the end of the interval. The interval should also end when some event would cause an agent's listener to be run (e.g. two moving actors collide with each other), or when a random simulated event occurs. The time of these events is deterministic as long as no agent is thinking, so the sim determines them in advance, and then it would have all available information to forecast the interval's end time.

If there's a human player interacting with the simulation too, then a human player action may happen; the simulator can convert the time of the action to the simulation time and include it in the timer's inputs. The agent's actions may have to be rolled back for one interval, depending on how the human input is integrated into the simulation. After determining the timing interval, the simulator simulates each actor for that length of time:

For (actor in simulation.actors):

The simulator retrieves the active coroutine, always the one on top of the stack:

coroutine=program.coroutines.peek( )

action=coroutine.command;

The simulator then determines how much time to give the action.

```
long current_time = timer.currentTime( );
if (action == null) {
    actor.time_last_acted = current_time;
    continue;
}
duration = current_time − actor.time_last_acted;
```

The simulator carries out the appropriate portion of the action. If the simulation deems that the action can't happen (via an ActionFailure exception), it sets flags on the aborted coroutine and marks it completed so it will be queued for resumption.

```
try {
    action_result = action.act(duration);
} catch (ActionFailure exception) {
    coroutine.interrupt = new ActionFailed(throwable);
    action_result = COMPLETED;
}
```

The simulator tells the processor to queue the coroutine for resumption if it has finished (successfully or otherwise).

```
if (action_result.is_completed( )) {
    coroutine.command = null;
    agentProcessor.coroutine_queue.add(coroutine);
    agentProcessor.signal( );
}
```

The simulator then re-registers incomplete actions with the simulation's timer.

```
else {
    timer.inputs.add(action);
    timer.signal( ); // (notify it there's new information)
}
```

According to one embodiment, at the start of the simulation, the simulation sets up all its state and then its starts the agents.

```
void spawnCoroutine(program, agent_routine) {
    coroutine = new Coroutine(program, agent_routine);
    program.coroutines.push(coroutine);
    agentProcessor.coroutine_queue.add(coroutine);
    agentProcessor.signal( );
}
for (program in programs) {
    spawnCoroutine(program, program.agent.run);
}
```

Throughout the simulation, events occur, and agents have implemented event listeners (in this example, LunchtimeListener is an event listener interface). When the simulation originates the event, it determines which programs want to handle those events.

```
listeners = new Set( );
for (program in simulation.all_programs( )) {
    if (program.agent is_instance_of LunchtimeListener) {
        listeners.add(program);
    }
}
```

Then, the processing logic, such as a coroutine manager, adds this to the program's coroutine stack and schedules it for resumption. Because it's on top of the program's coroutine stack, it will run; actions lower on the stack won't run until this one has exited (successfully or otherwise).

```
for (program in listeners) {
    spawnCoroutine(program, program.agent.lunchtime)
}
```

As described above, an agent routine or agent code may be developed by one developer while a coroutine may be developed by another developer. An agent processor may process multiple coroutines and each coroutine may invoke multiple agent routines developed by different developers or vendors. A game may involve multiple agent processors representing multiple actors or teams of actors. As a result, code may contains malfunction code compiled therein unintentionally or intentionally. For the security purpose, each of the agent routines or coroutine may be hosted in a sandboxed operating environment, such as a virtual machine (VM), such that a malfunction of a routine will not have a significantly impact on other routines or the operating system in general.

Figure 8:
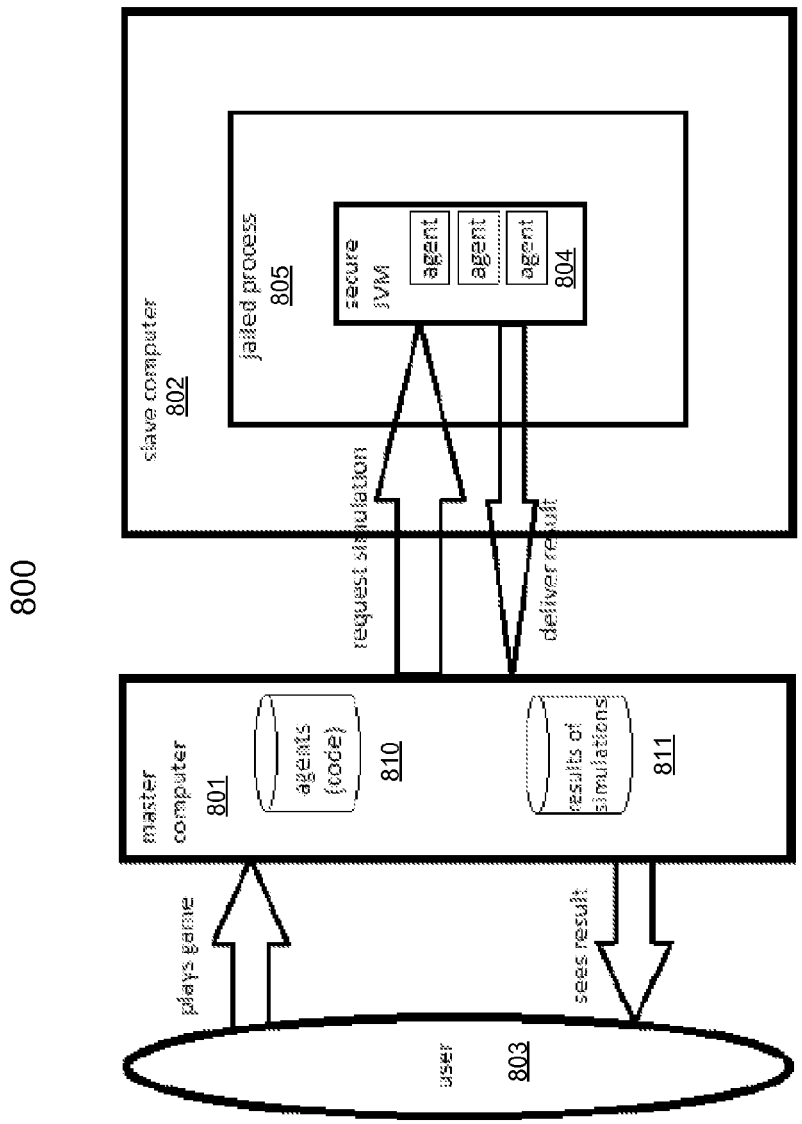
FIG. 8 is a block diagram illustrating an example of system architecture of agent code execution platform according to one embodiment of the invention.

FIG. 8 is a block diagram illustrating an example of system architecture of agent code execution platform according to one embodiment of the invention. Referring to FIG. 8, in this example, agent code is developed using Java programming language; however, other programming languages can also be utilized. According to one embodiment, a primary or master computer 801 and a secondary or slave computer 802 are utilized to form an agent execution platform or execution engine. For example, in a Web-based or cloud-based platform, primary computer(s) 801 may be implemented as part of a Web server(s), while secondary computer(s) 802 may be implemented as part of an application server(s) or backend server(s) communicatively coupled to primary computer(s) 801. Such architecture allows users 803 to access the resources (e.g., games) via frontend 801 over a network (e.g., Internet), where the resources are provided at backend 802 in a secure manner.

In one embodiment, the agent execution processes run in a Java virtual machine ("JVM"), which listens for requests to simulate. The JVM has an active security manager (not shown). The engine's security policy prohibits direct access to the structure of the simulation, and to the computer's operating system. Agents not written in Java run in Java-based interpreters; e.g., a Python agent runs in a Python interpreter implemented in Java, which converts Python code into Java objects. The entire interpreter is subject to almost the same security restrictions as Java agents. However, the interpreter needs some security privileges to convert the agent code into Java objects. Thus an embodiment of the invention uses a customized version of the interpreter, which prevents the agent code from enjoying the same privileges.

The JVM runs in a jailed process 805 on the computer's operating system such as a Linux™ operating system. If an agent gains control of JVM 804, jailed process 805 ensures that it cannot access any computing resources other than those necessary to run the simulation, nor any data stored on the computer 802. Computer 802 itself is a slave, dedicated only to serving requests to run the simulation. None of the owner's data or other programs reside on computer 802, and the computer's networking is configured so that it cannot initiate any connection over the network.

The agents themselves—the program source code or compiled object code that dictates agent behavior—are not stored on slave computer 802, nor are the results of the simulation. Instead, all requests to simulate originate on master computer 801, which stores the agents 810. The master 801 determines when a simulation is to be run, retrieves the agent software 810, and converts it to a serial format. The master 801 initiates a connection to the slave 802, transmitting the serialized agents along with the request to run the simulation. The slave 802 simulates and returns results 811 to the master. The master 801 stores the results and terminates the connection.

Another security consideration involves runaway code. The interruptible coroutine design, as described above, lets the agent code decide when to give up control. An agent may never give up control, either by malice or by accident. So the engine monitors the agent to ensure it gives up control within a maximum amount of time. If it does not, it tries to warn the agent, and then forcibly terminates it.

An agent that runs in this environment is of potential value to anyone in the world (the "customer") who takes an interest in its simulation. Customers may, or may not, have programming skill. The invention provides a marketplace where customers can find the agent that has the most desirable behavior in the simulation. The agents' performance in the simulation is analyzed, and the agents are profiled according to different metrics, which guide the customer's selection. The customer may be charged a payment for the use of the agent. Because the agent code is executed by the simulation, and not directly by the customer, a number of licensing options are available without further work to enforce licenses in the software. An agent's author may charge, for example, a flat fee for unlimited use of the agent by the customer, a flat fee following a free trial subscription period, a fee every time the agent runs in the simulation, or a fee only when the agent successfully completes a certain task in the simulation.

Figure 9:
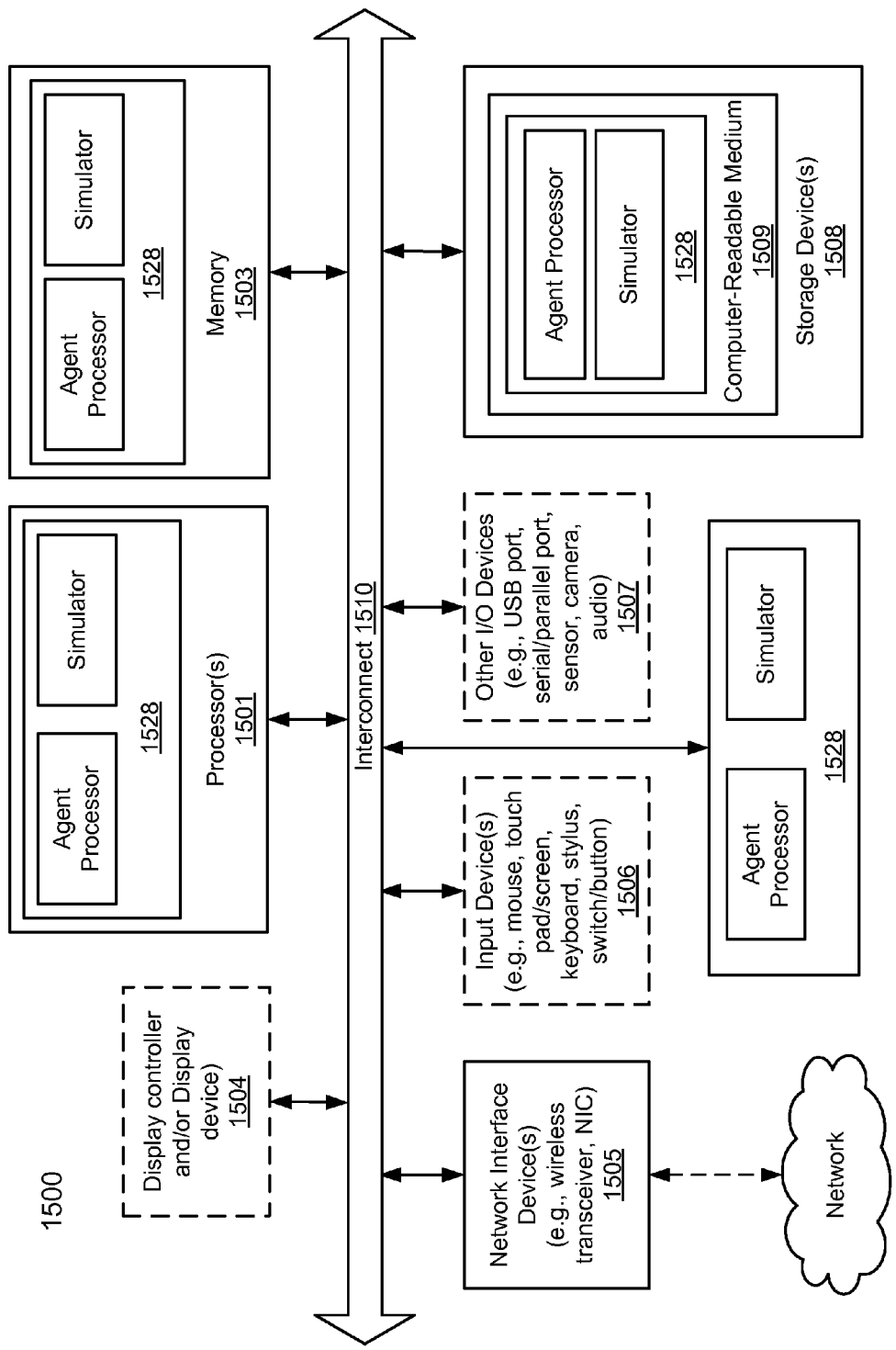
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, the systems as shown in FIGS. 2A-2B and 3. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for executing agent code in a data processing system, the method comprising:
   executing a plurality of agent routines associated with an agent instance representing an agent, each agent routine being hosted and invoked by one of a plurality of coroutines respectively;
   managing by an agent processor the coroutines hosting the agent routines via the agent instance, including
      receiving a first yield signal from a first of the coroutines indicating that a first of the agent routines yields to perform a first action that requires an action simulation,
      in response to the first yield signal, suspending the first coroutine,
      including
         receiving at the first coroutine a request from the first agent routine to perform the first action,
         in response to the request, setting a state and an action identifier of the first action in a first routine object associated with the first coroutine to indicate that the first action of the first coroutine requires an action simulation, and
         performing a yield action to release an execution lock to the agent processor, selecting a second of the coroutines from a head of a first agent queue maintained by the agent processor, and executing the second coroutine by assigning the execution lock to the second coroutine;

simulating by an action simulator the first action on behalf of the first coroutine; and signaling the agent processor to resume the first coroutine after completing the action simulation of the first action.

2. The method of claim 1, further comprising:

inspecting by the simulator a plurality of coroutine objects of the coroutines to exam a state of the coroutines to determine whether any of the coroutines requires a simulation; and for each of the coroutines that require an action simulation, determining an amount of simulation time and a type of action for the action simulation, and performing the action simulation based on the type of the action for the determined amount of simulation time.

3. The method of claim 2, wherein determining an amount of simulation time and a type of action for a simulation comprises:

for each of the coroutines that are pending for an action simulation, the simulator communicating with the agent processor to obtain an estimated amount of simulation time required for the action simulation, wherein the agent processor is configured to call an application programming interface (API) of each action object of each action to be simulated to obtain the estimated amount of simulation time;

calculating by the simulator a time interval based on the estimated amounts of simulation time received from the agent processor for all of the coroutines pending for an action simulation; and performing an action simulation for the time interval for a current scanning period of the simulator.

4. The method of claim 3, further comprising:

updating a plurality of timer objects associated with the coroutines by decrementing the time interval from the timer objects;

examining the timer objects to determine whether any of the timer objects has expired after the updating; and causing the agent processor to resume one or more of the coroutines that have its timer object expired.

5. The method of claim 2, wherein signaling the agent processor to resume the first coroutine further comprises after each simulation, inserting by the simulator an agent identifier identifying the first agent instance into a tail of the first agent queue maintained by the agent processor, such that the first coroutine can be selected for resume by the agent processor; and setting, by the simulator, the state in a first coroutine object of the first coroutine to indicate that the simulation of the first coroutine has been completed.

6. The method of claim 1, further comprising:

receiving by the agent processor from the simulator an event notification of an event occurred during the action simulation of the first agent routine;

in response to the event notification, determining by the agent processor that the agent instance is interested to receive the event notification;

spawning a second coroutine to host a second agent routine to process handling of the event notification;

pushing a second coroutine identifier into a coroutine stack maintained by the first agent instance, wherein the coroutine stack stores a plurality of coroutine identifiers identifying a plurality of pending coroutines of the first agent instance; and in response to an end of processing the event notification by the second coroutine, popping the second coroutine identifier from the coroutine stack.

7. The method of claim 6, further comprising:

receiving by the agent processor an abort signal from the first agent instance indicating that a first agent routine has aborted;

in response to the abort signal, for each of the coroutines pending in the coroutine stack, the agent processor notifying the coroutine regarding the abort signal; and each of the coroutine throwing an abort exception to its corresponding agent routine to enable the agent routine handling the abort exception.

8. A non-transitory machine-readable medium having instructions stored therein, which when executed by a processor, cause the processor to perform operations for executing agent code in a data processing system, the operations comprising:

executing a plurality of agent routines associated with an agent instance representing an agent, each agent routine being hosted and invoked by one of a plurality of coroutines respectively;

managing by an agent processor the coroutines hosting the agent routines via the agent instance, including receiving a first yield signal from a first of the coroutines indicating that a first of the agent routines yields to perform a first action that requires an action simulation, in response to the first yield signal, suspending the first coroutine, including receiving at the first coroutine a request from the first agent routine to perform the first action, in response to the request, setting a state and an action identifier of the first action in a first routine object associated with the first coroutine to indicate that the first action of the first coroutine requires an action simulation, and performing a yield action to release an execution lock to the agent processor, selecting a second of the coroutines from a head of a first agent queue maintained by the agent processor, and executing the second coroutine by assigning the execution lock to the second coroutine;

simulating by an action simulator the first action on behalf of the first coroutine; and signaling the agent processor to resume the first coroutine after completing the action simulation of the first action.

9. The non-transitory machine-readable medium of claim 8, wherein the operations further comprise:

inspecting by the simulator a plurality of coroutine objects of the coroutines to exam a state of the coroutines to determine whether any of the coroutines requires a simulation; and for each of the coroutines that require an action simulation, determining an amount of simulation time and a type of action for the action simulation, and performing the action simulation based on the type of the action for the determined amount of simulation time.

10. The non-transitory machine-readable medium of claim 9, wherein determining an amount of simulation time and a type of action for a simulation comprises:
for each of the coroutines that are pending for an action simulation, the simulator communicating with the agent processor to obtain an estimated amount of simulation time required for the action simulation, wherein the agent processor is configured to call an application programming interface (API) of each action object of each action to be simulated to obtain the estimated amount of simulation time;
calculating by the simulator a time interval based on the estimated amounts of simulation time received from the agent processor for all of the coroutines pending for an action simulation; and
performing an action simulation for the time interval for a current scanning period of the simulator.

11. The non-transitory machine-readable medium of claim 10, wherein the operations further comprise:
updating a plurality of timer objects associated with the coroutines by decrementing the time interval from the timer objects;
examining the timer objects to determine whether any of the timer objects has expired after the updating; and
causing the agent processor to resume one or more of the coroutines that have its timer object expired.

12. The non-transitory machine-readable medium of claim 9, wherein signaling the agent processor to resume the first coroutine further comprises
after each simulation, inserting by the simulator an agent identifier identifying the first agent instance into a tail of the first agent queue maintained by the agent processor, such that the first coroutine can be selected for resume by the agent processor; and
setting, by the simulator, the state in a first coroutine object of the first coroutine to indicate that the simulation of the first coroutine has been completed.

13. The non-transitory machine-readable medium of claim 8, wherein the operations further comprise:
receiving by the agent processor from the simulator an event notification of an event occurred during the action simulation of the first agent routine;
in response to the event notification, determining by the agent processor that the agent instance is interested to receive the event notification;
spawning a second coroutine to host a second agent routine to process handling of the event notification;
pushing a second coroutine identifier into a coroutine stack maintained by the first agent instance, wherein the coroutine stack stores a plurality of coroutine identifiers identifying a plurality of pending coroutines of the first agent instance; and
in response to an end of processing the event notification by the second coroutine, popping the second coroutine identifier from the coroutine stack.

14. The non-transitory machine-readable medium of claim 13, wherein the operations further comprise:
receiving by the agent processor an abort signal from the first agent instance indicating that a first agent routine has aborted;
in response to the abort signal, for each of the coroutines pending in the coroutine stack, the agent processor notifying the coroutine regarding the abort signal; and
each of the coroutine throwing an abort exception to its corresponding agent routine to enable the agent routine handling the abort exception.

15. A data processing system comprising:
a processor; and
a memory coupled to the processor for storing instructions, which when executed by the processor, cause the processor to perform operations, the operations including
executing a plurality of agent routines associated with an agent instance representing an agent, each agent routine being hosted and invoked by one of a plurality of coroutines respectively,
managing by an agent processor the coroutines hosting the agent routines via the agent instance, including
receiving a first yield signal from a first of the coroutines indicating that a first of the agent routines yields to perform a first action that requires an action simulation,
in response to the first yield signal, suspending the first coroutine,
including
receiving at the first coroutine a request from the first agent routine to perform the first action,
in response to the request, setting a state and an action identifier of the first action in a first routine object associated with the first coroutine to indicate that the first action of the first coroutine requires an action simulation, and
performing a yield action to release an execution lock to the agent processor,
selecting a second of the coroutines from a head of a first agent queue maintained by the agent processor, and
executing the second coroutine by assigning the execution lock to the second coroutine;
simulating by an action simulator the first action on behalf of the first coroutine; and
signaling the agent processor to resume the first coroutine after completing the action simulation of the first action.

16. The system of claim 15, wherein the operations further comprise:
inspecting by the simulator a plurality of coroutine objects of the coroutines to exam a state of the coroutines to determine whether any of the coroutines requires a simulation; and
for each of the coroutines that require an action simulation,
determining an amount of simulation time and a type of action for the action simulation, and
performing the action simulation based on the type of the action for the determined amount of simulation time.

17. The system of claim 16, wherein determining an amount of simulation time and a type of action for a simulation comprises:
for each of the coroutines that are pending for an action simulation, the simulator communicating with the agent processor to obtain an estimated amount of simulation time required for the action simulation, wherein the agent processor is configured to call an application programming interface (API) of each action object of each action to be simulated to obtain the estimated amount of simulation time;

calculating by the simulator a time interval based on the estimated amounts of simulation time received from the agent processor for all of the coroutines pending for an action simulation; and performing an action simulation for the time interval for a current scanning period of the simulator.

18. The system of claim 17, wherein the operations further comprise:

updating a plurality of timer objects associated with the coroutines by decrementing the time interval from the timer objects;

examining the timer objects to determine whether any of the timer objects has expired after the updating; and causing the agent processor to resume one or more of the coroutines that have its timer object expired.

19. The system of claim 16, wherein signaling the agent processor to resume the first coroutine further comprises after each simulation, inserting by the simulator an agent identifier identifying the first agent instance into a tail of the first agent queue maintained by the agent processor, such that the first coroutine can be selected for resume by the agent processor; and setting, by the simulator, the state in a first coroutine object of the first coroutine to indicate that the simulation of the first coroutine has been completed.

20. The system of claim 15, wherein the operations further comprise:

receiving by the agent processor from the simulator an event notification of an event occurred during the action simulation of the first agent routine;

in response to the event notification, determining by the agent processor that the agent instance is interested to receive the event notification;

spawning a second coroutine to host a second agent routine to process handling of the event notification;

pushing a second coroutine identifier into a coroutine stack maintained by the first agent instance, wherein the coroutine stack stores a plurality of coroutine identifiers identifying a plurality of pending coroutines of the first agent instance; and in response to an end of processing the event notification by the second coroutine, popping the second coroutine identifier from the coroutine stack.

21. The system of claim 20, wherein the operations further comprise:

receiving by the agent processor an abort signal from the first agent instance indicating that a first agent routine has aborted;

in response to the abort signal, for each of the coroutines pending in the coroutine stack, the agent processor notifying the coroutine regarding the abort signal; and each of the coroutine throwing an abort exception to its corresponding agent routine to enable the agent routine handling the abort exception.

* * * * *